United States Patent [19]
Hudson

[11] 3,873,339
[45] Mar. 25, 1975

[54] METHOD OF FORMING OPTICAL WAVEGUIDE CIRCUIT PATH

[75] Inventor: Marshall C. Hudson, Corning, N.Y.

[73] Assignee: Corning Glass Works, Corning, N.Y.

[22] Filed: Feb. 1, 1974

[21] Appl. No.: 438,527

Related U.S. Application Data

[63] Continuation-in-part of Ser. No. 239,745, March 30, 1972, abandoned.

[52] U.S. Cl............ 117/17, 117/23, 117/40, 117/70 B, 117/70 S, 117/93.3, 117/124 A, 117/125, 117/96 WG
[51] Int. Cl......... B44c 1/06, C03c 7/04, C23d 5/08
[58] Field of Search............ 117/23, 70 B, 70 S, 40, 117/93.3, 124 A, 125, 17; 350/96 WG

[56] References Cited
UNITED STATES PATENTS

| | | | |
|---|---|---|---|
| 2,272,342 | 2/1942 | Hyde | 49/78.1 |
| 2,326,059 | 8/1943 | Nordberg | 106/52 |
| 3,106,858 | 10/1963 | Ward | 117/23 |
| 3,135,591 | 6/1964 | Jones | 55/16 |
| 3,395,366 | 7/1968 | Snitzer et al. | 331/94.5 |
| 3,396,401 | 8/1968 | Nonomura | 117/21 UR X |
| 3,440,092 | 4/1969 | Best et al. | 117/33.5 |
| 3,560,258 | 2/1971 | Brisbane | 117/212 |
| 3,737,292 | 6/1973 | Keck et al. | 350/96 WG X |
| 3,809,732 | 5/1974 | Chandross et al. | 350/96 WG X |

OTHER PUBLICATIONS

*Spattered Glass Waveguide for Integrated Optical Circuits*, Bell System Technical Journal, Vol. 48, No. 10, 9/1969, Goell, Standley Primary Examiner—William D. Martin
Assistant Examiner—Shrive P. Beck
Attorney, Agent, or Firm—William J. Simmons, Jr.; Clarence R. Patty, Jr.

[57] ABSTRACT

A method of producing a planar optical waveguide circuit path by applying to at least a portion of a smooth surface of a glass substrate having a predetermined desired index of refraction a first coating of glass particles having an index of refraction greater than that of the glass substrate. A beam of laser light is caused to impinge upon the first coating and is caused to move thereacross in a predetermined manner to form a narrow path of fused glass on the surface of the substrate. After the remaining unfused glass particles are removed, a film of glass having an index of refraction less than that of the fused glass path may be applied over that path and at least a portion of the exposed surface of the substrate adjacent thereto.

14 Claims, 4 Drawing Figures 3,873,339

METHOD OF FORMING OPTICAL WAVEGUIDE CIRCUIT PATH

CROSS-REFERENCE TO RELATED APPLICATION

This is a continuation-in-part of application Ser. No. 239,745, filed Mar. 30, 1972 and now abandoned.

BACKGROUND OF THE INVENTION

Integrated optical circuits are the basis of a new emerging field. Light is guided through integrated optical circuits by means of planar optical waveguides which are constructed from amorphous or crystalline dielectric materials that are transparent to the energy being transmitted. Planar optical waveguides as herein referred to are films or layers of such materials having a thickness equal to about the wavelength of the light or energy transmitted and a predetermined desired width. Ordinarily, waveguides are termed planar when the width thereof is substantially greater than the thickness, while waveguides having a smaller width to thickness ratio are termed rectangular waveguides or narrow optical "strip" guides. For the purpose of the present invention, however, the term planar waveguide will be used to denote all noncircular waveguides, regardless of the width to thickness ratio thereof. Moreover, planar waveguides can be formed on substrate surfaces that are other than planar, and it is conceivable that optical circuits may be formed on curved substrates such as cylinders or the like. However, since energy radiates from curved optical waveguides, the amount of radiated energy increasing with decreasing radius of curvature, substrate curvature should be minimized.

Some operational theories and other pertinent information concerning planar optical waveguides may be found in the publication "Evanescent Field Coupling into a Thin-Film Waveguide" by J. E. Midwinter, IEEE Journal of Quantum Electronics, vol. QE-6, no. 10, October, 1970, pages 583–590; "Integrated Optical Circuits" by J. E. Goell et al., Proceedings of the IEEE, vol. 58, no. 10, October, 1970, pages 1504–1512; and "Dielectric Waveguide and Directional Coupler for Integrated Optics" by E. A. J. Marcatilli, Bell System Technical Journal, vol. 48, September, 1969, pages 2071–2102.

It is well known to one skilled in the art that light can be caused to propagate along a transparent member which has a higher refractive index than its surroundings. Planar optical waveguides are useful in integrated optical circuits for computers or for coupling, demodulation, or other purposes in optical communications systems. The advantages of integrated optical circuits over electrical circuits is speed of signal transmission, ruggedness, long life, and the like. Waveguides produced for these purposes must avoid excessive attenuation of the transmitted light to be effective. Further, to be an effective transmitting media within an integrated optical circuit, a planar waveguide should not only transmit light without excessive attenuation, but also should not cause excessive dispersion of the transmitted light and should allow only preselected modes of light to propagate along the waveguide.

No simple and economical technique for fabricating planar optical waveguides has yet been demonstrated. Attempts are continually being made to produce planar optical waveguides having low losses. For example, planar waveguides have been fabricated by sputtering a transparent material onto a transparent substrate having a refractive index lower than that of the sputtered layer. Portions of the sputtered layer are removed by such etching techniques as electron beam and ion beam etching, thereby leaving narrow planar waveguide paths on the substrate. These planar waveguides do not permit high transmission efficiencies because of the rough edges thereof which cause high attenuation losses and because of scattering and absorption losses inherent in the materials used.

SUMMARY OF THE INVENTION

It is an object of the present invention to provide a method of producing a narrow planar optical waveguide.

Broadly, according to this invention a planar optical waveguide circuit path is produced by applying to at least a portion of a surface of a glass substrate having a predetermined desired index of refraction a first coating of glass particles having an index of refraction greater than that of the glass substrate. A beam of laser light is directed onto the first coating to sinter those glass particles upon which the beam impinges due to absorption of light thereby, and relative movement between the substrate and the beam forms a path of fused glass. After removing from the substrate the unfused portion of the first coating, a path of fused glass suitable for the propagation of light wave energy remains on the surface of the glass substrate.

DETAILED DESCRIPTION OF THE INVENTION

It is to be noted that the drawings are illustrative and symbolic of the invention and there is no intention to indicate scale or relative proportion of the elements shown therein.

Figure 1:
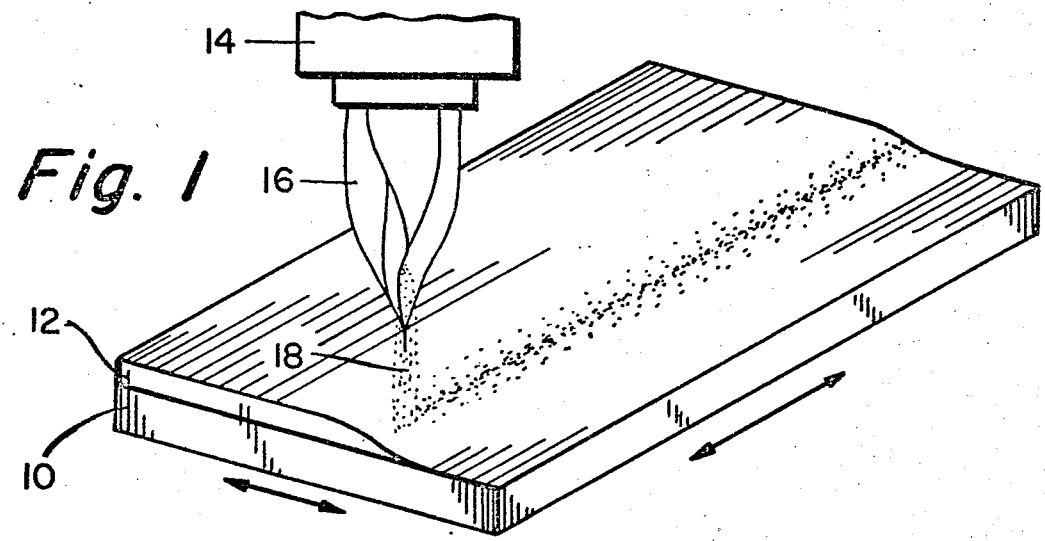
FIG. 1 is an oblique illustration of the application of a first coating to a substrate in the formation of a planar optical waveguide.

Referring to FIG. 1, there is shown a transparent substrate 10 having a smooth surface to which a first coating 12 of extremely small glass particles is applied. Coating 12 may be formed by mixing glass particles in a volatile vehicle and spraying or brushing the resultant mixture onto the substrate surface. This coating could also be applied by depositing soot by the flame hydrolysis process, this latter method being illustrated in the drawings. First coating 12 is applied to at least a portion of one of the exposed smooth glass surfaces of substrate 10 and the glass particles thereof have an index of refraction greater than that of substrate 10.

A particularly effective method of forming or applying a coating of glass particles is accomplished by flame hydrolysis process similar to that described in U.S. Pat. No. 2,272,342 issued to J. F. Hyde or U.S. Pat. No. 2,326,059 issued to M. E. Nordberg. A modification of the Nordberg process that will provide a titanium doped silica glass coating is as follows. Dry oxygen is bubbled through a tank containing a liquid mixture of silicon-tetrachloride, SiCl₄, and titanium-tetrachloride, TiCl₄, which mixture is at a temperature of approximately 35°C. SiCl₄ and TiCl₄ vapors picked up by the oxygen are then carried to flame hydrolysis burner 14 of FIG. 1. Burner 14 emits a flame 16 in which the gas-vapor mixture is hydrolyzed to form a soot, that is, minute glass particles, the composition of which depends upon the proportion of SiCl₄ and TiCl₄ vapors present in the gas-vapor mixture. The soot leaves flame 16 in a stream 18 and is directed toward one of the flat surfaces of substrate 10. The thickness of the resulting coating is determined by the amount of soot deposited which is primarily controlled by the flow rate, the time allowed for deposition, and the velocities at which the substrate is translated.

Substrate 10 is suitably mounted in the path of stream 18 and caused to translate in both the forward and backward as well as the side directions to permit the application of first coating 12 over all or the desired portion of substrate 10. Suitable means for translating substrate 10 in both directions may be any means known in the art for accomplishing this purpose such for example as a milling machine bed or a dual motorized platform with a chuck mounting for the substrate. The limits of translated movements are controlled by microswitches linked to reversing motor drive systems.

It is to be understood that an elongated ribbon burner that provides a long stream of soot could be used in place of the substantially concentric burner illustrated in the drawing whereby the substrate would require translation in one direction only. Further, a plurality of burners 14 could be employed in a row to similarly require translation in one direction only. A plurality of burners suitably spaced over the entire area of the substrate, to which it is desired to apply a coating, would eliminate the need for any translation of the substrate. Similarly, if the area to be coated is sufficiently small, one burner 14 as illustrated in the drawing, could be used to apply the entire coating without translation of the substrate.

Figure 2:
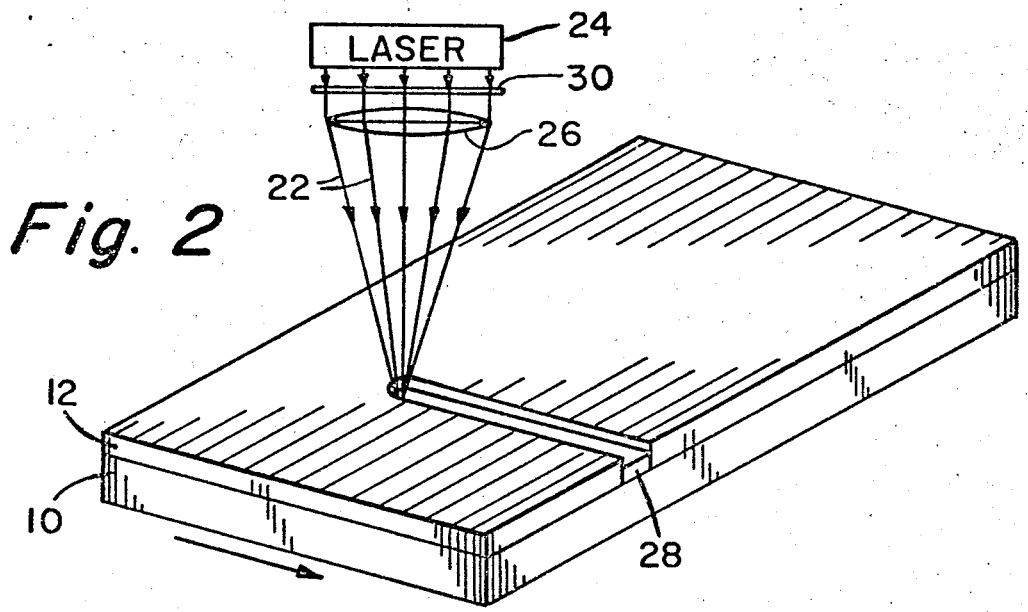
FIG. 2 is an oblique illustration of the formation of a fused glass path on the substrate.

As shown in FIG. 2 a beam 22 of laser light is directed upon predetermined portions of first coating 12 to fuse the glass particles at such predetermined portions, thereby forming a narrow path of glass on the surface of substrate 10. As used herein the term "fuse" means complete melting of the glass particles so that they become consolidated into a continuous layer of nonparticulate glass in which no particle boundaries exist. Incomplete melting resulting in boundaries between adjacent particles could cause scattering of light which would render the resultant device unacceptable for use as an optical waveguide. To form very narrow paths, the light from laser 24 may be focused onto coating 12 by a lens system represented by lens 26. The wavelength of the laser light is such that it is absorbed by at least one component that is present in the glass particles of coating 12. The intensity of the laser radiation can be controlled by inserting a suitable filter 30 in the path thereof. A laser beam can be focused down to a spot, the minimum diameter of which is diffraction limited and is thus dependent upon the wavelength of the radiation. High quality lenses having f-numbers approaching unity can focus a beam of collimated laser light to a spot having a diameter equal to 2.44λ where the surrounding medium is air. The laser wavelength must be chosen such that either the base glass composition of the particles or an impurity therein absorbs the laser radiation. For example, silica in the form of a thin coating of powder absorbs about ninety percent of the incident radiation at a wavelength of 10.6 μm, which can be provided by a CO₂ laser. The minimum focused spot size for such radiation is (2.44 × 10.6 μm) or about 26 μm. At short wavelengths, i.e., wavelengths in the ultraviolet region of the spectrum, the molar extinction coefficients of various dopant materials cause strong absorption, the amount of energy absorbed being given by the equation $$I_{(absorbed)} = I_{(incident)} (1 - e^{-\epsilon c d}) \quad (1)$$

where ϵ is the molar extinction coefficient of the dopant, c is the concentration of the absorbing ion and d is the thickness of the absorbing layer. Due to the aforementioned relationship between wavelength and spot diameter, it can be seen that ultraviolet light can be focused to a smaller spot than the previously mentioned CO₂ laser radiation. Ultraviolet light having a wavelength of 0.3 μm can be focused down to a spot size of about 0.8 μm. Smaller light spots can be obtained by disposing the coated substrate in a medium wherein the refractive index is greater than that of air. Such a medium could be used to control the intensity of the radiation incident upon the glass particles as well as provide a suitable refractive index. The heat generated by absorption laser light fuses and consolidates the glass particles of coating 12 to form a path 28 of uniform dense material. Due to consolidation of the particles, the thickness of path 28 is less than that of coating 12. The laser beam and/or substrate 10 can be moved in order to form the desired optical path 28.

That portion of coating 12 which remains unfused is then removed by any technique suitable for removing particles from the surfaces of glass substrates. Techniques such as high pressure sprays, light brushing or scrubbing, and immersion in detergents, solvents or rinses may be used. Those particles which resist removal by the aforementioned techniques can be dissolved by an acid solution which attacks the small particles remaining on the surface of the substrate much more readily than it attacks the substrate. The remaining acid can be removed by rinsing.

The structure so formed functions as a planar optical waveguide since path 28 is capable of propagating light wave energy. However, dust and other surface contamination, which is likely to occur on an exposed surface, will drastically reduce the light transmitting properties of such a waveguide. Further, a superior optical waveguide will result if a medium having a refractive index higher than that of air is disposed upon the surface of path 28. This could be achieved, for example, by submersing path 28 and the adjacent portion of substrate 10 into a liquid having the appropriate refractive index. However, the preferred medium for surrounding path 10 is a continuous film or layer of nonparticulate glass. Since some of the light transmitted by an optical waveguide is propagated in the cladding, the glass film should be free from defects such as bubbles, seeds, particle boundaries and the like. The surface of path 28 could be suitably finished prior to applying a glass film having a predetermined index of refraction lower than that of path 28 over the exposed surface of path 28 and at least that portion of the exposed surface of substrate 10 which is adjacent to path 28. This glass film may be applied by a variety of methods including but not limited to radio frequency sputtering, fusing a coating of soot deposited by the flame hydrolysis process, chemical vapor deposition, fusing a coating of glass frit or powder, and the like.

Figure 3:
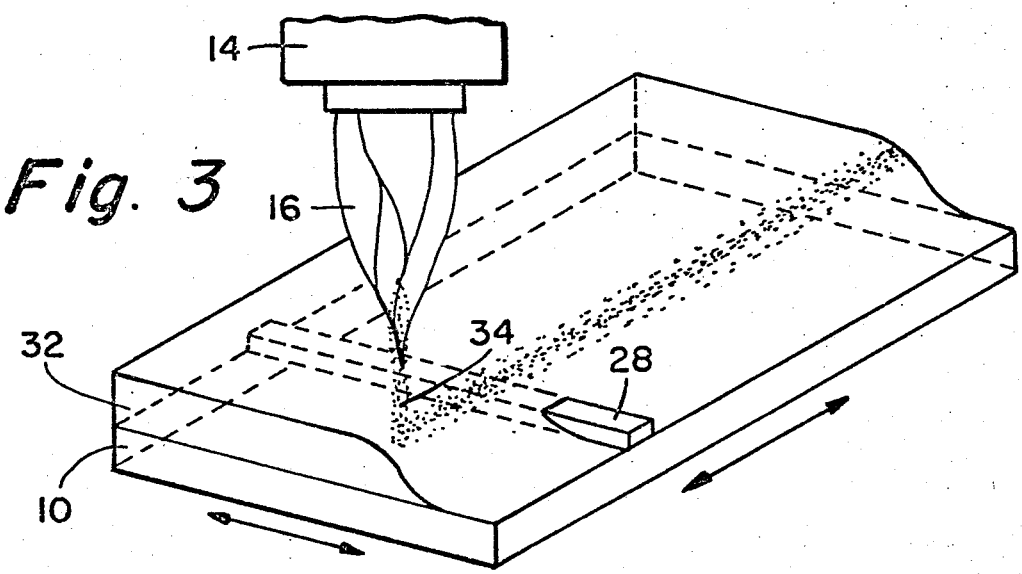
FIG. 3 is an oblique illustration of the application of a second coating in the formation of a planar optical waveguide.

As illustrated in FIG. 3, wherein a second coating 32 of soot is deposited by the same flame hydrolysis process method heretofore noted, the soot leaves flame 16 in a stream 34 and is directed to the exposed surfaces of substrate 10 and path 28. The substrate and path 28 can be translated as heretofore described for uniform deposition of the second coating of soot; however, coating 32 need only be applied to path 28 and the adjacent portion of substrate 10 since path 28 functions as the core of the resultant planar optical waveguide while substrate 10 and the fused second coating function as the cladding.

Figure 4:
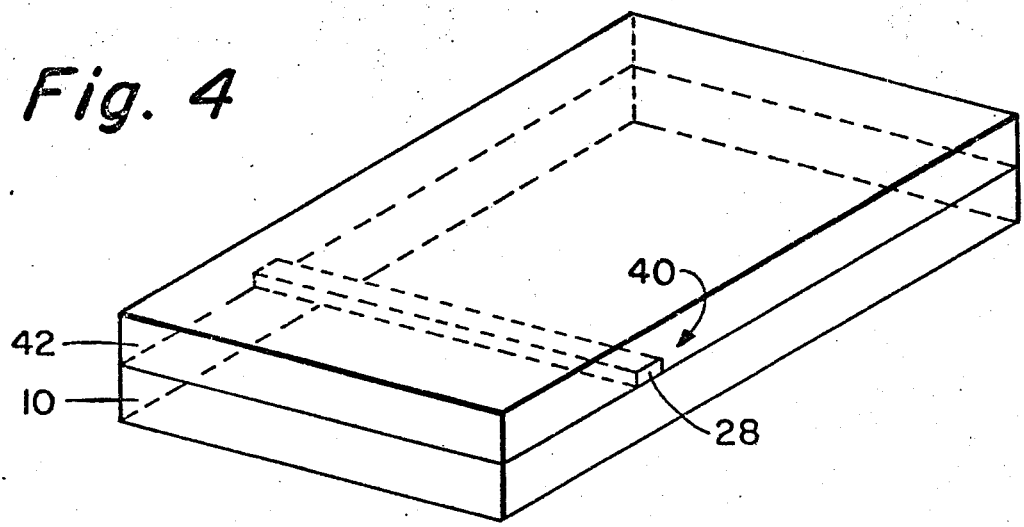
FIG. 4 is an oblique illustration of a planar optical waveguide formed in accordance with the method of the present invention.

If the glass film is initially deposited in the form of a coating of soot or glass frit, such coating must be fused either simultaneously with the deposition thereof or by a subsequent operation to provide a uniform and dense film of nonparticulate glass. Referring to FIG. 4, there is illustrated a portion of an integrated optical circuit including a planar optical waveguide 40 consisting of substrate 10, path 28 and a glass film 42 which may be applied in a single deposition step or which may be applied as a coating of soot or powder and subsequently fused to form a dense glass film.

The materials of substrate 10, path 28 and film 42 should be produced from a glass having minimum light absorption characteristics, and although any optical quality glass may be used, a particularly suitable base glass from which to make a planar optical waveguide is fused silica. For structural and other practical considerations, it is desirable for the core and cladding glasses to have similar physical characteristics. Since the core glass must have a higher index of refraction than the cladding for proper operation, the core glass may desirably be formed of the same basic type of glass used for the cladding but doped with a small amount of some other material to slightly increase the index of refraction thereof. Therefore, if pure fused silica is used as the cladding glass, fused silica doped with a material to increase the index of refraction can be used as the core glass.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide and germanium oxide. The amount of dopants used should be carefully controlled for various reasons. For example, since additional doping material would cause the index of refraction to increase, the difference between the index of refraction of the cladding glass and the core glass would also increase requiring a decrease in the allowable core thickness in accordance with well known principles of optical waveguides. Further, if an excessive amount of doping material is added to the base material, a loss in light transmission will result. Desirably, a precise amount of dopant should be added to the base material for the primary purpose of changing the index of refraction. For the purposes of the present invention, the amount of dopant is preferably maintained below about 40 percent by weight of the total composition depending on the dopant. For example, aluminum oxide may be added up to about 40 percent by weight, while titanium oxide should be maintained below about 20 percent by weight.

Glass film 42 must have suitable physical and optical properties, such as coefficient of expansion and index of refraction. A particularly effective method of forming film 42 is to fuse a soot coating of the desired material applied by the modified flame hydrolysis process heretofore described. Since the index of refraction of the cladding and consequently the glass film 42 must be lower than that of the core or path 28, the glass of film 42 may be of the same base material as path 28 except that it is undoped or is doped to a lesser degree than the glass which forms path 28. If film 42 is formed by first applying a second soot coating by the modified flame hydrolysis process heretofore described, the process parameters would be substantially the same, except that the starting liquid mixture would either not contain titanium-tetrachloride so that the resulting film would be pure $SiO_2$ or would contain a lesser amount of titanium-tetrachloride so that the resulting film would be $SiO_2$ doped to a lesser degree that path 28.

For a planar optical waveguide to transmit a useable quantity of light, light energy should not be lost through radiation due to light scattering centers, nor should it be excessively absorbed by the transmission material. These centers are often caused by tiny air bubbles or impurities in a waveguide at the core-cladding bond. The preferred method of this invention combines an unusually clean and strong bond, thus eliminating most of the light scattering centers. Further, the method of the present invention provides high purity glass and permits ease of composition variation.

In accordance with the present invention, a planar optical waveguide or circuit path is produced as follows. A pure fused silica substrate having a thickness of at least 20 $\mu$m is carefully polished and cleaned to provide an optically flat surface. A liquid mixture containing about 26.1 percent by weight $TiCl_4$ and 73.9 percent by weight $SiCl_4$ is heated to 35°C. Dry oxygen is bubbled through the liquid mixture and $SiCl_4$ and $TiCl_4$ vapors are picked up by the oxygen. This vapor containing oxygen is then passed through a gas-oxygen flame where the vapors hydrolyze to form a steady stream of approximately 0.1 $\mu$m sphere-like particles having a composition of approximately 2% by weight $TiO_2$ and 98 percent by weight $SiO_2$. The stream is directed towards the optically flat surface of the substrate and a coating of soot is built up to a thickness of less than, but about 5.4 $\mu$m. Laser light from a $CO_2$ laser having a wavelength of approximately 10.6 $\mu$m is focused onto portions of the soot coating, thereby forming a narrow path of doped fused silica as a result of the absorption by the soot of the high intensity laser radiation. Consolidation of the soot particles during fusing results in a doped fused silica path having a thickness less than 2.7 $\mu$m. The unconsolidated soot remaining on the substrate is scrubbed away by brushing the loose particles from the substrate, dissolving the remaining soot particles with hydrofluoric acid and thereafter rinsing the substrate to remove the acid. Thereafter, liquid $SiCl_4$ is then heated to about 35°C. and dry oxygen is bubbled through this liquid so that $SiCl_4$ vapors are picked up by the oxygen. This vapor-oxygen mixture is then passed through a gasoxygen flame where the vapors hydrolyze to form a steady stream of 100 percent $SiO_4$ soot particles. The stream is directed to the surface of the doped fused silica path and the exposed surface of the substrate and a coating of soot is built up to a thickness of about 40 μm. This structure is then placed in an induction furnace having an oxygen atmosphere at about 1500°C. to fuse the second soot coating, thereby forming a fused silica film having a thickness of about one half that of the soot coating from which it was formed. The resulting planar optical waveguide then has a core having a thickness of less than 2.7 μm and cladding on each side of about 20 μm. The index of refraction of the doped fused silica path or core will be approximately 1.4633. The index of refraction of the substrate and the fused silica film will be approximately 1.4584. An index of refraction of 1.4584 for fused silica is generally accepted for sodium light having a wavelength of 5893 A.

I claim:

1. A method of forming a planar optical wave-guide comprising the steps of
   providing a glass substrate having a predetermined desired index of refraction,
   applying a first coating of glass particles having an index of refraction greater than that of said glass substrate to at least a portion of one surface of said substrate,
   directing a beam of laser light onto said first coating to fuse those glass particles upon which said beam impinges due to absorption of light energy thereby,
   moving said substrate relative to said beam to form a path of fused glass,
   removing from said substrate the unfused portion of said first coating, and
   disposing on the entire exposed surface of said path of fused glass and at least a portion of the exposed surface of said substrate which is adjacent thereto a continuous film of non-particulate glass having a refractive index less than that of said path of fused glass.

2. The method of claim 1 wherein said first coating of glass particles is formed by depositing a layer of glass soot on at least a portion of one flat surface of said substrate by flame hydrolysis.

3. The method of claim 1 wherein said glass film is formed by the steps of
   depositing a second coating of glass particles over said path of fused glass and at least a portion of the exposed surface of said substrate adjacent thereto, and
   heating said second coating to fuse the glass particles thereof.

4. The method of claim 3 wherein said second coating is formed by depositing by flame hydrolysis a coating of glass soot over said path of fused glass and at least a portion of the exposed surface of said substrate adjacent thereto.

5. The method of claim 1 wherein said first coating of glass particles is formed by the step of depositing a first coating of doped silica soot over at least a portion of one flat surface of said substrate by flame hydrolysis, and wherein said glass film is formed by the step of depositing by the flame hydrolysis process a second coating of silica soot over said path of fused glass and at least a portion of the exposed surface of said substrate adjacent thereto and heating the structure so formed until said second coating of soot fuses and forms said film of glass.

6. The method of claim 5 wherein said first coating of soot is silica doped with at least one material selected from the group consisting of titanium oxide, tantalum oxide, tin oxide, niobium oxide, zirconium oxide, aluminum oxide, lanthanum oxide and germanium oxide.

7. The method of claim 5 wherein said first coating of soot is silica doped with not more than 20 percent by weight titanium oxide.

8. The method of claim 1 wherein said film of glass is applied by radio frequency sputtering.

9. The method of claim 1 wherein said film of glass is applied by chemical vapor deposition.

10. The method of claim 1 wherein said film of glass is formed by applying a glass frit and thereafter fused said frit.

11. A method of forming a planar optical waveguide comprising the steps of
    providing a substantially flat glass substrate having a predetermined desired index of refraction,
    depositing over at least a portion of one flat surface of said substrate by flame hydrolysis a first coating of doped silica soot having an index of refraction greater than that of said substrate,
    directing a beam of laser light onto said first coating to fuse that soot upon which said beam impinges due to absorption of light energy thereby,
    moving said substrate relative to said beam to form a path of doped fused silica,
    removing from said substrate the unfused portion of said first coating,
    depositing by flame hydrolysis a second coating of silica soot over said path of doped fused silica and at least a portion of the exposed surface of said substrate adjacent thereto and,
    heating the structure so formed to form from said second coating a film of fused silica.

12. The method of claim 11 wherein said substrate consists of silica.

13. The method of claim 12 wherein said first coating of soot is silica doped with at least one material selected from the group consisting of titanium oxide, tantalum oxide, tin oxide, niobium oxide, zirconium oxide, aluminum oxide, lanthanum oxide and germanium oxide.

14. The method of claim 12 wherein said first coating of soot is silica doped with not more than 20 percent by weight titanium oxide.

* * * * *